(12) United States Patent
Büthker

(10) Patent No.: US 10,014,766 B2
(45) Date of Patent: Jul. 3, 2018

(54) MAINS POWER CONVERTER, A CONTROLLER THEREFOR, AND METHODS OF OPERATING THE SAME

(71) Applicant: NXP B.V., Eindhoven (NL)

(72) Inventor: Henricus Cornelis Johannes Büthker, Mierlo (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/255,248

(22) Filed: Sep. 2, 2016

(65) Prior Publication Data

US 2017/0070136 A1     Mar. 9, 2017

(30) Foreign Application Priority Data

Sep. 3, 2015    (EP) .................................... 15183633

(51) Int. Cl.
    *H02M 3/04*      (2006.01)
    *H02M 1/12*      (2006.01)
    (Continued)

(52) U.S. Cl.
    CPC ............... *H02M 3/04* (2013.01); *H02M 1/12* (2013.01); *H02M 1/14* (2013.01); *H02M 1/15* (2013.01);
    (Continued)

(58) Field of Classification Search
    CPC   Y02B 70/126; Y02B 70/123; Y02B 70/1491; H02M 1/12; H02M 1/4208;
    (Continued)

(56) References Cited

U.S. PATENT DOCUMENTS

| 6,778,416 B2 * | 8/2004 | Bruno | H02M 7/2176 323/222 |
| 7,894,216 B2 * | 2/2011 | Melanson | H02M 1/4225 323/222 |

(Continued)

FOREIGN PATENT DOCUMENTS

EP      2775604 A1    9/2014

OTHER PUBLICATIONS

Berman, Mel; "All about EMI filters—Selecting these devices requires identifying the type and source of interference as well as applicable standards"; Electronic Products; retrieved from the internet http://us.tdk-lambda.com/ftp/other/all_about_emi_epmag.pdf; 3 pages (Oct. 2008).

(Continued)

*Primary Examiner* — Nguyen Tran
*Assistant Examiner* — Kevin H Sprenger

(57) ABSTRACT

A power converter, configured to convert AC mains power to a DC output voltage which is lower than the AC mains' peak voltage, is disclosed. It comprises: a capacitor configured to store charge at a voltage range which is intermediate the peak voltage and the DC output voltage; a gated rectification stage comprising a rectifier for rectifying an AC mains power, and at least one switch configured to supply the rectified AC mains power to the capacitor during only a low-voltage part of a half-cycle of the AC mains; and a switched mode DC-DC power conversion stage comprising at least one further switch and configured to convert power from the capacitor to the DC output voltage during only a high-voltage part of the half-cycle. A controller for use in such a converter, and a corresponding method, are also disclosed.

18 Claims, 3 Drawing Sheets

(51) Int. Cl.
  *H02M 1/14* (2006.01)
  *H02M 1/15* (2006.01)
  *H02M 1/44* (2007.01)
  *H02M 7/217* (2006.01)
  *H02M 7/06* (2006.01)
  *H02M 1/00* (2006.01)

(52) U.S. Cl.
  CPC ............... *H02M 1/44* (2013.01); *H02M 7/06* (2013.01); *H02M 7/2176* (2013.01); *H02M 2001/007* (2013.01)

(58) Field of Classification Search
  CPC ........ H02M 1/4225; H02M 1/14; H02M 1/15; H02M 1/143; H02M 1/4266; H02M 1/32; H02M 1/36; H02M 1/34; H02M 1/092; H02M 1/088; H02M 1/4233; H02M 7/06; H02M 7/7575; H02M 7/062; H02M 7/1623; H02M 7/08; H02M 7/10; H02M 7/19; H02M 7/106; H02M 7/103; H02M 7/153; H02M 7/17; H02M 7/066; H02M 7/068; H02M 7/493; H02M 7/53871; H02M 7/525; H02M 7/219; H02M 7/12; H02M 7/217; H02M 5/4505; H02M 5/4585; H02M 3/33592; H02M 3/1584; H02M 3/285; H02M 3/33561; H02M 3/156; H02M 3/33507; H02M 3/33523; H02M 3/157
  USPC ... 363/44–48, 50–54, 65, 67–70, 76–82, 84, 363/89, 125–126; 323/223–225, 270–271
  See application file for complete search history.

(56) References Cited

U.S. PATENT DOCUMENTS

| | | | |
|---|---|---|---|
| 9,087,656 B1* | 7/2015 | Vinciarelli | H01H 9/54 |
| 9,379,618 B2* | 6/2016 | Freeman | H02M 1/10 |
| 9,673,717 B2* | 6/2017 | Freeman | H02M 3/33546 |
| 2008/0285316 A1 | 11/2008 | Park et al. | |
| 2009/0059623 A1 | 3/2009 | Cai | |
| 2009/0129133 A1 | 5/2009 | Khan | |
| 2013/0163295 A1 | 6/2013 | Lu et al. | |
| 2015/0223303 A1* | 8/2015 | Hsia | H05B 33/0884 315/121 |
| 2016/0380528 A1* | 12/2016 | Gao | H02M 1/15 363/21.12 |

OTHER PUBLICATIONS

Extended European Search Report for Patent Appln. No. 15183633.5 (dated Feb. 24, 2016).

* cited by examiner

MAINS POWER CONVERTER, A CONTROLLER THEREFOR, AND METHODS OF OPERATING THE SAME

CROSS-REFERENCE TO RELATED APPLICATIONS

This application claims the priority under 35 U.S.C. § 119 of European patent application no. 15183633.5, filed Sep. 3, 2015 the contents of which are incorporated by reference herein.

FIELD OF THE INVENTION

This disclosure relates to power converters configured to convert AC mains power to a DC output voltage, controllers therefor and to methods of operating the same.

BACKGROUND OF THE INVENTION

Many applications which operate at a low voltage such as 3.3V, or 5V or 12V, benefit from being connected to a mains power supply. Previously, a conventional way of obtaining a low voltage was to use a high-voltage capacitive divider, in which a capacitor is used as an impedance. The capacitor current is rectified and used. This method is efficient, but the capacitor is large and expensive.

Another conventional solution is to use rectification and a switched mode DC-DC converter, which may be configured to operate with a high efficiency, but these are generally expensive, due to the high voltages involved. At the low duty cycles involved, these are challenging to control; for example to convert 325V down to 3.3V, the DC-DC converter would have to operate at only 1% duty-cycle.

A further known solution, which is generally less expensive than use of a DC-DC converter, is to use a linear voltage regulator, such as a low drop-out voltage regulator (LDO). A voltage regulator typically comprises a power FET and a differential amplifier. The differential amplifier compares the output voltage—or alternatively and more commonly a well-defined fraction of the output voltage—with a reference voltage, and drives the power FET in linear mode to maintain a fixed output voltage. A voltage regulator would be extremely inefficient if used to down-convert a mains voltage to a typical low-voltage: for instance, used with the same 220V mains supply resulting in peak voltages of 325V, to provide power for a 3.3V output voltage, it has to drop 322 V. So, in known solutions, the supply to the voltage regulator is normally provided by a capacitor, which is charged to an intermediate voltage (just above the output DC voltage for good efficiency) from the rectified mains. Establishing the intermediate voltage is typically done by so-called "gated rectification", in which the mains is rectified by a bridge rectifier, and the output switchedly connected to the capacitor. It has been proposed to replace the voltage regulator with a DC-DC converter, such as a switched mode power converter.

However, ripple from the DC-DC converter may generate EMI.

SUMMARY

According to a first aspect of the present disclosure, there is provided a power converter configured to convert AC mains power to a DC output voltage which is lower than a peak voltage of the AC mains, the AC mains having a half-cycle consisting of a low-voltage part and a high-voltage part, the power converter comprising: a capacitor configured to store charge at a voltage range which is intermediate the peak voltage and the DC output voltage; a gated rectification stage comprising a rectifier for rectifying an AC mains power, and at least one switch configured to supply the rectified AC mains power to the capacitor during only the low-voltage part of a half-cycle of the AC mains; and a switched mode DC-DC power conversion stage comprising at least one further switch and configured to convert power from the capacitor to the DC output voltage during only the high-voltage part of a half-cycle of the AC mains. The at least one switch may be a single switch, or may be more than one switch—for example in embodiments in which the rectifier is a full bridge rectifier, there may be provided a switch for each of two the output-side arms of the full-bridge rectifier. In other embodiments, one or more diodes of the rectifier may be replaced by a respective synchronous rectification switch. The synchronous rectification switch or switches may then be at least a part of the one or more switches.

By operating the DC-DC power conversion stage to operate during only the high-voltage part of a half-cycle of the AC mains, it becomes possible to effectively isolate the source of EMI—that is to say, the switched mode DC-DC converter—from the mains input, without requiring the use of an EMI in-line filtering.

In one or more embodiments, a maximum absolute voltage of the AC mains during the low-voltage part of a half-cycle of the AC mains is no more than 4 times the DC output voltage, or no less than 2V more than the DC output voltage. The intermediate voltage may be within a range having a minimum being no less than 2V higher than the DC output voltage, and a maximum which is not more than 4 times the minimum.

In one of more embodiments, the cycle has a cycle period, and the low-voltage part of a half-cycle occupies no more than 5% of the cycle period.

In one or more embodiments, the power converter may further comprise a smoothing capacitor coupled to an output of the DC-DC power conversion stage and for smoothing the DC output voltage. Such a smoothing capacitor may reduce the effect of temporarily disabling the DC-DC power conversion stage during the low-voltage part of the mains half-cycle.

In one or more embodiments, the power converter may further comprise a controller configured to ensure the at least further switch is open, thereby disabling the DC-DC converter, during the low-voltage part of a half-cycle of the AC mains.

According to another aspect of the present disclosure, there is provided a controller configured to operate a mains power converter as described above, and comprising a first switch control subunit adapted to periodically open and close the at least one switch to generate a gated rectification and charge a capacitor to an intermediate voltage, and a further switch control subunit adapted to, in response to the at least one switch being open, periodically open and close the at least one further switch to generate an output voltage, the intermediate voltage being intermediate a peak voltage of the mains and the output voltage.

According to a further aspect of the present disclosure, there is provided a mains power supply for a mobile device and comprising a power converter as just described, an input for direct connection to a mains supply, and an output for direct connection to the mobile device. The mains power supply might not include any other inductive component or EMI or mains filter. The mains power supply may, nevertheless, be suitable for use in applications in which a high harmonic quality of the mains is required.

According to another aspect of the present disclosure, there is provided an electronic equipment comprising a mains power supply as just discussed. The electronic equipment may further comprise a memory and a processor, or other circuitry such as a graphical user interface, at least one of which is operable at a voltage of 3.3V, 5 V and 12V.

According to a further aspect of the present disclosure, there is provided a method of converting an AC mains power to a DC output voltage which is lower than a peak voltage of the AC mains, the AC mains having a half-cycle consisting of a low-voltage part and a high-voltage part, the method comprising: rectifying the AC mains power, and switching at least one switch to supply the rectified AC mains power to a capacitor during only the low-voltage part of a half-cycle of the AC mains; storing the charge in the capacitor at a voltage range which is intermediate the peak voltage and the DC output voltage; and operating a least one further switch, the at least one further switch being comprised in a DC-DC power conversion stage configured to convert power from the capacitor to the DC output voltage during only the high-voltage part of a half-cycle of the AC mains.

The DC-DC power converter may be any one of a variety of types of switched mode power converter. For instance and without limitation, it may be a flyback converter, or a half-bridge converter; generally the DC-DC converter may be a buck-converter, since a buck converter reduces the voltage between the input and the output.

BRIEF DESCRIPTION OF DRAWINGS

Embodiments of the invention will be described, by way of example only, with reference to the drawings, in which.

Figure 1:
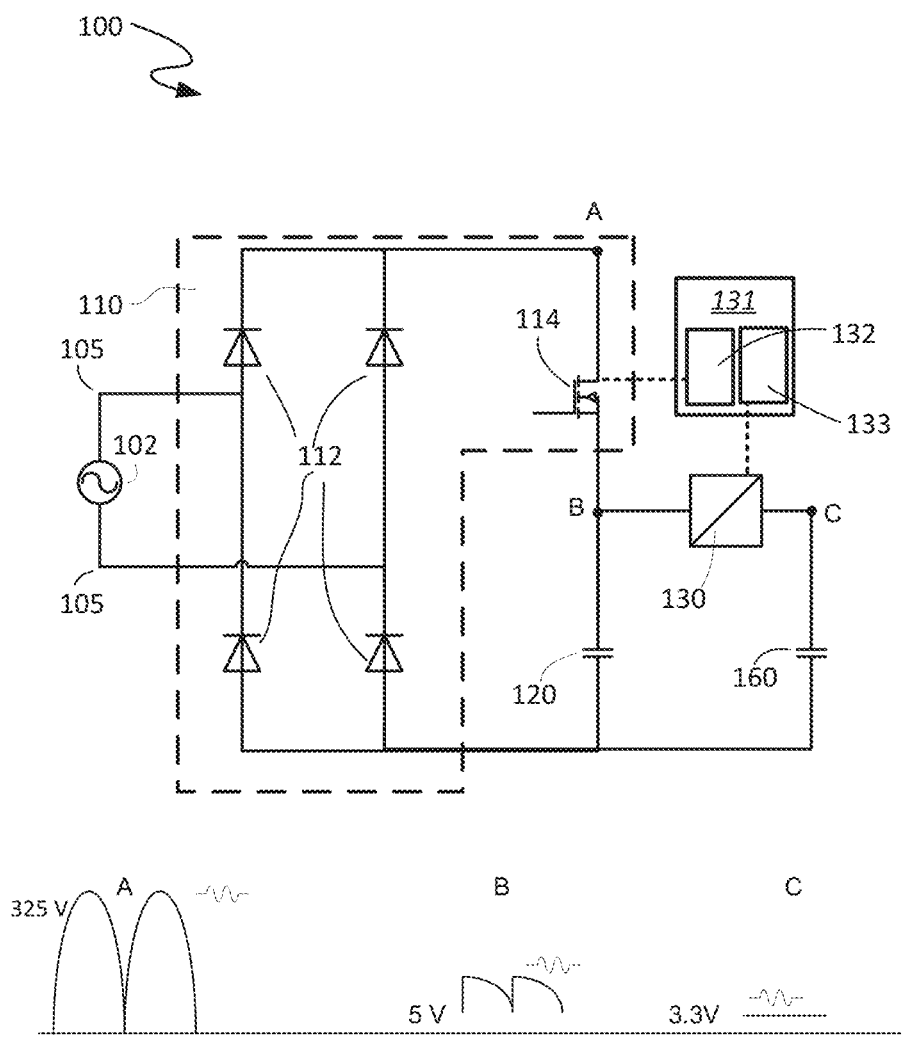
FIG. 1 shows, schematically, a power converter comprising a gated rectification stage, an intermediate capacitor and a DC-DC power conversion stage.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

FIG. 1 shows a power converter 100. The power converter 100 comprises an input 105 which may be connected, as shown, direct to an AC mains supply 102. The AC mains supply 102 is rectified by bridge rectifier 112. The rectified voltage is connected intermittently, that is to say, in a gated fashion, across capacitor 120, the connection and disconnection being controlled by means of switch 114 in series with the capacitor 120. The rectifier 112 and switch 114 thus comprise a gated rectification stage 110.

The capacitor 120 acts as an input source to a switched mode DC-DC power converter 130. An output smoothing capacitor 160 may be connected across the output of the DC-DC power converter, from which the output is also taken.

The figure also shows the voltage waveforms at three positions or nodes: node A, which is at the output of the rectifier; node B, which is at the output of the gated rectification stage—that is to say at the input of the capacitor 120; and node C at the output of the power converter. The scales of the voltage waveforms are not the same. As is shown schematically each of the waveforms is affected by ripple arising from the switching operation of the DC-DC power conversion stage. It will be appreciated that although the gated rectification has a periodicity which is twice the mains frequency, the DC-DC power conversion stage typically switches in frequencies in the range of kilohertz to megahertz, for instance 0.5 kHz to 5 MHz—that is to say at a frequency which is between 10 and 100,000 times higher than main frequencies—the frequency of the ripple on the signals is correspondingly higher (the scale of the ripple has been stretched in the diagram in order to prevent its obscuration).

In order to prevent the ripple from the DC-DC power converter stage corrupting the mains input, the skilled person may introduce an EMI filter arrangements between the mains input and the gated rectification stage. Such an EMI filter arrangement may be provided as one or more separate components. A standard EMI filter arrangement can remove EMI sufficiently to comply with legal requirements, but is rather large and costly and reduces efficiency. In comparison, a gated rectifier is a very small circuit with high efficiency.

Figure 2:
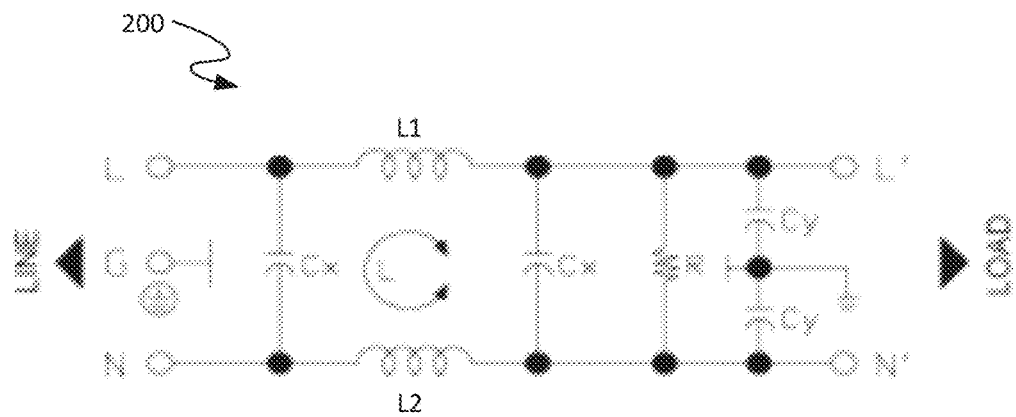
FIG. 2 shows a block diagram of a conceptual two stage power converter, including EMI isolation.

FIG. 1 also shows, schematically a controller 131, which comprises a control subunit 132 and a second control subunit 133. The controller subunit 132 and the second control subunit 133 are for controlling, respectively, the gated rectification stage and the DC-DC power conversion stage A typical schematic diagram of a conventional EMI filter is shown in FIG. 2, and comprises a series-parallel arrangement of so-called X-capacitors Cx between the live and neutral part of the mains line-in, and inductors (or chokes) L1, L2. This is followed by a second stage f so-called Y-capacitors (Cy).

However, the inventor has appreciated that the EMI disturbance is introduced by operating a switched mode power conversion stage during the interval that the rectification stage is connected, and that this interval is relatively short; thus, by disabling the switched mode power conversion stage during the interval that the rectification stage is supplying charge to the capacitor, it may be possible to improve the EMI performance of the overall device.

Figure 3:
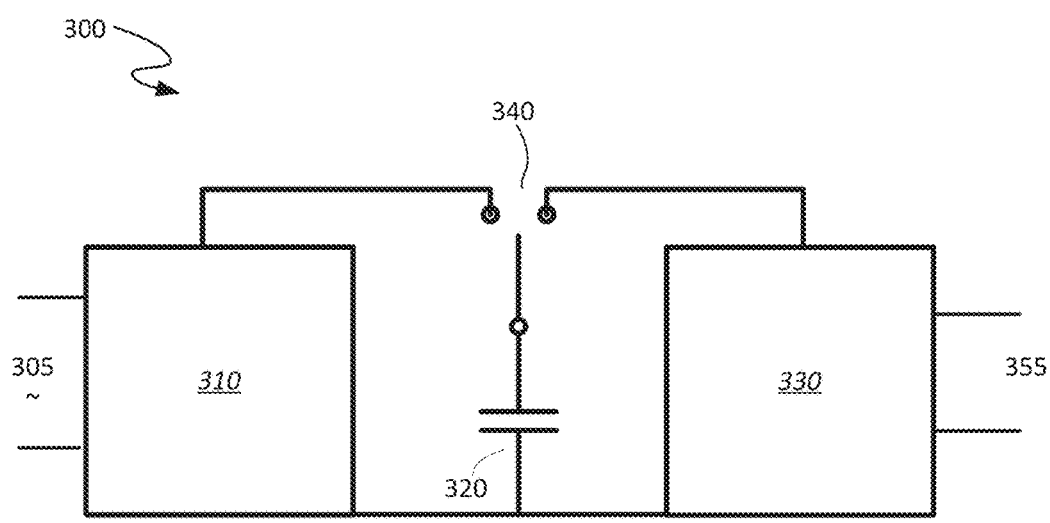
FIG. 3 shows a flow diagram according to an example method according to the present disclosure.

This is shown, schematically, in FIG. 3. FIG. 3 shows a schematic of a power converter 300 configured to convert AC mains power to a DC output voltage which is lower than a peak voltage of the AC mains. The power converter comprises a capacitor 320 configured to store charge at a voltage range which is intermediate the peak voltage and the DC output voltage. The power converter further comprises a gated rectification stage 310. The gated rectification stage is not shown in detail, but may include a rectifier for rectifying an AC mains power as shown in FIG. 1, and at least one switch configured to supply the rectified AC mains power to the capacitor during only the low-voltage part of a half-cycle of the AC mains. This is effected, conceptually, by switching the selection switch 340 to the left, to connect the gated rectification stage 310 to the capacitor, during the low-voltage part of the mains half-cycle.

The power converter also comprises a second stage 330. The second stage is a switched mode DC-DC power conversion stage. The second stage comprises at least one further switch and is configured to convert power from the capacitor to the DC output voltage during only the high-voltage part of a half-cycle of the AC mains. This is effected, conceptually, by switching the switch 340 to the right, during the high voltage part of the half-cycle of the AC-mains.

As is shown in conceptually in FIG. 3, the switch 340 is a double pole single throw (DPST) switch, so only one, of the first stage—gated rectification, and the second stage—DC-DC power converter, is connected to the capacitor at any moment. As a result any EMI which results from the DC-DC power conversion stage, for instance from the relatively high frequency switching of the DC-DC power conversion stage, can be isolated from the gated rectification stage, and thus the requirement for a EMI filter arrangement may be removed. The skilled person will appreciate that operation of a DPST may include a "dead" period during switching, while neither pole is connected—in the present instance, this corresponds to an optional transition stage; for instance the DC-DC operation starts up only once the gated rectification has resulted in the gating switch being opened. So-called "flash-over" may thereby be prevented.

Although, as shown in FIG. 3, the isolation may be provided by a separate switch, in other embodiments, the isolation may be effected by use of the gating switch or switches in the rectification stage, in combination with the switch or switches in the DC-DC power conversion stage. Specifically, since the gating switch isolates the rectifier from the DC-DC conversion stage when gating switch is open, it is only necessary to ensure that the DC-DC power conversion stage is inoperable whenever the gating switch is closed, to provide the appropriate isolation.

The specific implementation method chosen to ensure that the DC-DC power conversion stage is inoperable, will depend on the specific type of DC-DC converter used. For instance, in the case of a half-bridge converter, this may be achieved by holding both the low-side switch and the high-side switch open, through the duration of the low-voltage part of the mains half-cycle whilst the gating switch is closed.

Figure 4:
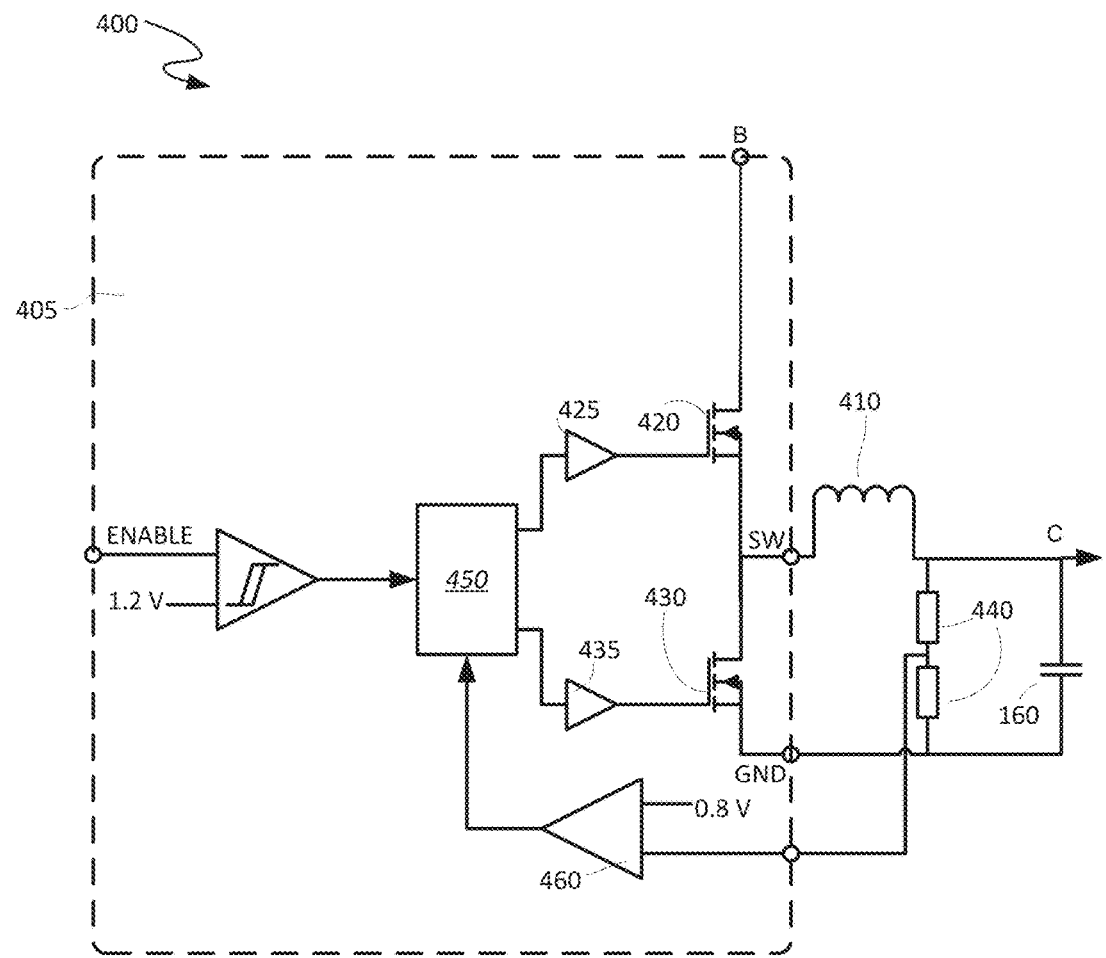
FIG. 4 shows an example of a switched mode DC-DC power conversion stage which may be used in of one or more embodiments.

An example DC-DC power conversion stage which may be comprised in one or more embodiments, is shown in FIG. 4. The figure shows a half-bridge converter 400 which as shown may operate as a hysteretic converter. The converter comprises a controller 405, and inductor 410, which has an output terminal connected to the converter output (shown at node C), for providing a DC output voltage, and an input terminal connected to the intermediate, or half-bridge, node SW connecting two, series connected, switches 420 and 430. One of these two switches, 420, forms a high-side switch (HSS), with its other main terminal being connected to the DC-DC power converter input (at node B). The other of these two switches, 430, forms a low-side switch (LSS), with its other main terminal being connected to ground. The two switches 420 and 430 are controlled through their respective control terminals by means of a control subunit 450 which provides logic and dead time control. The control subunit provides outputs to respective drivers 425 and 435 to drive the control terminals of the HSS 420 and LSS 430. A smoothing capacitor 160 is provided across the output of the DC-DC power conversion stage, and a resistor divider 440 is also provided across the output in order to provide a scaled version of the DC output voltage to an operational amplifier (opamp) 460 which compares the scaled version with a reference voltage, which may be for instance be 0.8V as shown. The opamp 460 sends an output enable signal to the control subunit 450, in the event that the scaled version of the output voltage falls below 0.8 V, thereby indicating that the HSS 420 should be closed and the LSS 430 opened in order to connect the half bridge node SW to the DC-DC power conversion stage's input voltage at node B.

Control subunit 450 is further supplied with another input, which is provided from the output of a comparator which compares a further reference voltage (which may be, as shown 1.2 V) with an "ENABLE" input. This "ENABLE" input determines whether the gating switch of the gated rectification stage is open.

In the event that the gating switch of the gated rectification stage is closed, the control subunit 450 disables the hysteretic converter, by opening both HSS and LSS switch 420 and 430. The HSS and LSS are both held open until the gating switch of the gated rectification stage is opened. Since the switching of the hysteretic converter is thereby interrupted, any EMI associated with, or generated by, such switching is suspended. The input to the power converter 100 is thus isolated from the DC-DC power conversion stage.

It will be appreciated, that as shown in FIG. 4, the controller 405 may include the HSS 420 and LSS 430 which may comprise the one or more further switches. In other embodiments the controller 405 may be distinct components or separate from the one or more further switches, for instance HSS 420 and LSS 430 may be distinct or separate from the controller 405, such as is shown in FIG. 1, in which subcontroller 133 for the DC-DC power conversion stage is shown as being separate from the DC-DC power conversion stage itself.

Furthermore, it will be appreciated that the double pole single throw switch 320 shown in FIG. 3, may comprise a combination of the HSS, LSS just described and the gated rectification gating switch. In one or more other embodiments, in which the DC-DC power conversion stage is provided by another type of converter, such as for instance the fly back converter having only one switching component, the conceptual switch 320 may be comprised of the gated rectification stage gating switch and the switching component of the DC-DC power conversion stage.

Methods of operation of DC-DC converters suitable for use in embodiments will be well-known to the skilled person, and so will not be repeated here. It is noted, however, that a particularly convenient, though non-limiting, control methodology is hysteretic control. As the skilled person will appreciate, in hysteretic control, a comparator is used to measure the voltage on the output capacitor, and whenever the output voltage drops below the desired value—for example 3.3V, a conversion pulse is generated.

From reading the present disclosure, other variations and modifications will be apparent to the skilled person. Such variations and modifications may involve equivalent and other features which are already known in the art of power converters, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A power converter configured to convert AC mains power to a DC output voltage which is lower than a peak voltage of an AC mains, the AC mains having a half-cycle consisting of a low-voltage part and a high-voltage part, the power converter comprising:
   a capacitor configured to store charge at a voltage range which is intermediate of the peak voltage and the DC output voltage;
   a gated rectification stage comprising a rectifier configured to rectify the AC mains power, and a first switch configured to supply the rectified AC mains power to the capacitor during only the low-voltage part of the half-cycle of the AC mains; and
   a switched mode DC-DC power conversion stage comprising a second switch and configured to convert power from the capacitor to the DC output voltage during only the high-voltage part of the half-cycle of the AC mains.

2. The power converter as claimed in claim 1, wherein a maximum absolute voltage of the AC mains during the low-voltage part of the half-cycle of the AC mains is no more than 4 times the DC output voltage.

3. The power converter as claimed in claim 2, wherein the maximum absolute voltage during the low-voltage part of the half-cycle of the AC mains is no less than 2V more than the DC output voltage.

4. The power converter as claimed in claim 1, wherein the intermediate voltage is within a range having a minimum being no less than 2V higher than the DC output voltage, and a maximum which is not more than 4 times the minimum.

5. The power converter as claimed in claim 1, wherein the low-voltage part of the half-cycle occupies no more than 5% of a cycle period.

6. The power converter as claimed in claim 1, further comprising
   a smoothing capacitor coupled to an output of the DC-DC power conversion stage and configured to smooth the DC output voltage.

7. The power converter as claimed in claim 1, further comprising:
   a controller configured to ensure the second switch is open thereby disabling the DC-DC converter during the low-voltage part of the half-cycle of the AC mains.

8. A controller configured to operate the power converter as claimed in claim 1, and comprising
   a first switch control subunit configured to periodically open and close the first switch to generate a gated rectification and charge the capacitor to an intermediate voltage which is intermediate the peak voltage and the DC output voltage, and
   a second switch control subunit configured to, in response to the first switch being open, periodically open and close the second switch to generate the DC output voltage.

9. A mains power supply for a mobile device and comprising the power converter according to claim 1,
   an input configured for direct connection to the AC mains, and
   an output configured for direct connection to the mobile device.

10. An electronic equipment comprising a mains power supply, the mains power supply comprising the power converter as claimed in claim 1.

11. The electronic equipment as claimed in claim 10, further comprising a memory and a processor, at least one of which is operable at a voltage of 3.3V, 5 V, and 12V.

12. A method of converting an AC mains power to a DC output voltage which is lower than a peak voltage of an AC mains, the AC mains having a half-cycle consisting of a low-voltage part and a high-voltage part, the method comprising:
   rectifying the AC mains power;
   switching a first switch to supply the rectified AC mains power to a capacitor during only the low-voltage part of the half-cycle of the AC mains;
   storing the charge in the capacitor at a voltage range which is intermediate of the peak voltage and the DC output voltage; and
   operating a second switch, the second switch being comprised in a switched mode DC-DC power conversion stage configured, to convert power from the capacitor to the DC output voltage during only the high-voltage part of the half-cycle of the AC mains.

13. The power converter of claim 1, wherein the first switch is a single pole double throw switch.

14. The power converter of claim 1, further comprising:
   a resistor divider configured to provide a scaled version of the DC output voltage.

15. The power converter of claim 14, further comprising:
   an operational amplifier configured to compare the scaled version of the DC output voltage with a reference voltage.

16. The method of claim 12, wherein the first switch is a single pole double throw switch.

17. The method of claim 12, further comprising:
   providing, with a resistor divider, a scaled version of the DC output voltage.

18. The method of claim 17, further comprising:
   comparing, with an operational amplifier, the scaled version of the DC output voltage with a reference voltage.

* * * * *